UNITED STATES PATENT OFFICE.

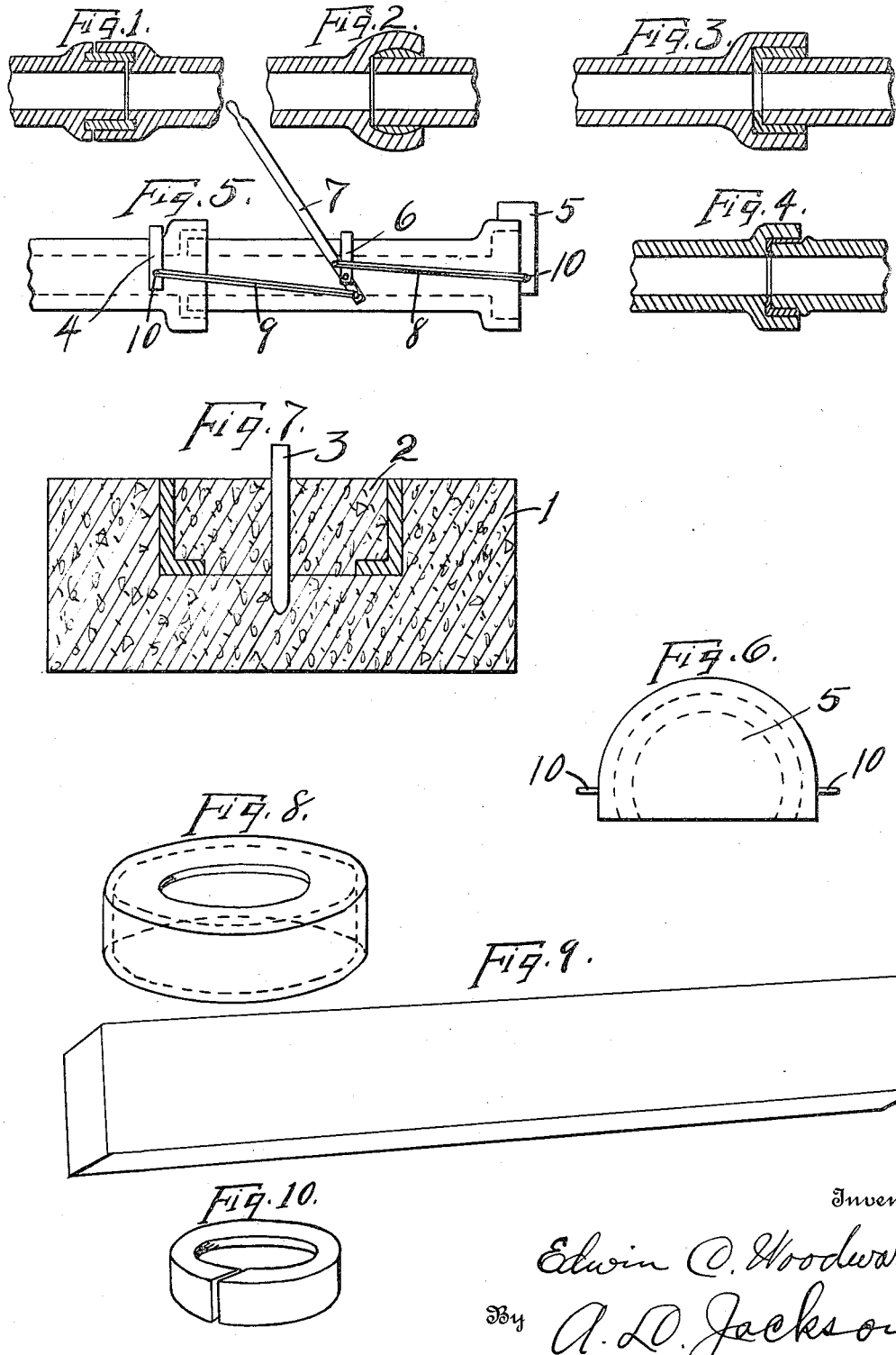

EDWIN C. WOODWARD, OF DALLAS, TEXAS, ASSIGNOR TO E. P. WOODWARD, OF DALLAS, TEXAS, AND E. R. WOODWARD, OF FORT WORTH, TEXAS.

PROCESS OF SEALING PIPE-JOINTS.

1,240,287.　　　　　Specification of Letters Patent.　　Patented Sept. 18, 1917.

Application filed August 14, 1916.　Serial No. 114,757.

*To all whom it may concern:*

Be it known that I, EDWIN C. WOODWARD, a citizen of the United States, residing at Dallas, in the county of Dallas and State of Texas, have invented certain new and useful Improvements in Processes of Sealing Pipe-Joints, of which the following is a specification.

My invention relates to a method or process of sealing pipe joints and more particularly to sealing the joints of sewer or soil pipes. There is much leaking of pipes which are sealed in the practice now used and this leaking causes dangerously unsanitary conditions. The object of this invention is to provide packing rings or gaskets of a material that will not be attacked by acids and which contains no fibrous material, such as shown in the patent to E. G. Wright, No. 728,065, May 12, 1903, or the patent to Isbell, No. 3,459, May 25, 1869. Another object is to prepare gaskets or packing rings which can be used at any time by subjecting the rings to the treatment hereinafter set forth. Other objects and advantages will be fully explained in the following description and the invention will be more particularly pointed out in the claims.

Reference is had to the accompanying drawings which form a part of this application.

Figure 1 is a section of a pipe and a gasket ring. Figs. 2, 3, and 4 are sections of different forms of pipe joints and gasket rings. Fig. 5 illustrates devices for forcing the pipe joints into the desired positions for sealing. Fig. 6 is an end view of the end piece of the devices shown in Fig. 5. Fig. 7 is a section of a mold and a gasket ring, showing the manner of molding or preparing the packing or gasket rings. Fig. 8 is a perspective view of the kind of packing ring which may be made and used. Fig. 9 is a perspective view of a section of a ribbon prepared for making gaskets. Fig. 10 is a perspective view of ring or gasket made from such ribbon as shown in Fig. 9.

Similar characters of reference are used to indicate the same parts throughout the several views.

Gasket rings are prepared in any suitable manner, as by a mold 1 and a core 2 with a centering standard 3. Asphaltic gaskets are prepared and used to fill the spaces between the adjoining or overhanging bells of the pipe joint and the spigot ends of the pipes. The gaskets may be composed of either pure bitumen or bitumen combined with silicious or other suitable mineral aggregate and must be of such shape and size as to fill the space between the inside of the overhanging bell and the sides of the spigot ends of the pipes. The gaskets may be of any suitable shape, such as shown in Figs. 1 to 4 or Fig. 8. In order to effect a perfect seal and to make the gaskets fill out all possible space in the joint and to conform to the contour of the bell and spigot end, the gaskets are softened to make the same pliable and adjustable within the joint. In order to prepare the gaskets for sealing, they are softened by heat or by treating with a solvent, such as a distillate of petroleum or other suitable solvent of bitumen. The ends of the gaskets which are to come in contact with the shoulder inside the overhanging bell are softened so that when the gaskets are forced or when the ends of the pipes are forced into the bells, the gaskets will conform to the interior contour of the bells and be forced down or inwardly between the spigot ends of the pipes and the shoulders of the bell. The gaskets or packing rings incidentally form centering devices for the spigot ends of the pipes, and no other provision for centering the pipes is necessary.

For the purpose of forcing the pipes to make the joints assume their proper adjustments, an apparatus is provided. A saddle 4 is provided to be mounted on a pipe section which has been connected and sealed. A pressing block or segment 5 is provided for engaging the bell end of the pipe to be sealed. A saddle 6 is mounted on the pipe section which is to be forced in and sealed. A lever or yoke lever 7 is fulcrumed on the saddle 6 and a link rod 8 is pivotally connected to the lever 7 and to the segment 5 and a link bar 9 is pivotally connected to the saddle 4 and to the lever 7. A pull on the lever toward the sealed section of pipe will force the spigot end of the pipe to be sealed into the bell of the sealed section of pipe and cause the gasket which has been softened at the proper end to conform to the interior shoulder of the bell and to extend inwardly between the shoulder of the bell and the spigot end of the pipe and thus make a perfect seal and at the same time the spigot end of the pipe will be centered in the bell.

The yoke 4, segment 5, and yoke 6 may be provided with pivot lugs 10 for connecting the link bars 8 and 9 and the lever 7.

The softening of the packing rings may be accomplished in different ways, as above described. The solvent will soften the packing rings and then evaporate. The bell or receiving end of the pipe section may be lined with the softening material or solvent. The rings are thus malleable and pliable so that they will readily fill all the space between the spigot end or rim of the pipe section and the overhanging bell of the other section.

Instead of molding the material directly into gaskets or packing rings, the material may be molded into ribbons as shown in Fig. 9 and then formed into gaskets or rings as shown in Fig. 10. The material can be cut into the proper lengths to make rings and then softened by a solvent or heat, as above set forth, and then formed into rings.

What I claim, is,—

1. The herein described process of sealing pipe joints consisting of preparing bituminous packing rings, treating the packing rings with a solvent for softening the rings, and then forcing the pipes and a packing ring together.

2. The herein described method of sealing pipe joints consisting of preparing packing rings of bituminous material, treating the packing rings for softening the same, placing the ring in the receiving end of the pipe, and forcing the spigot end of the pipe into the packing ring and causing the same to conform to the contour of the interior of the receiving end of a pipe section and to the contour of the exterior of the spigot end of a pipe section.

3. The herein described process of sealing pipe joints consisting of preparing packing rings of bituminous material or asphaltic material, treating the packing for softening the same, placing the packing ring in the receiving end or bell of a pipe section, and forcing the spigot end of a pipe section into the packing ring and causing the same to conform to the interior of the said bell and to the exterior of the spigot end and between the spigot end and said bell.

In testimony whereof, I set my hand, this 10th day of August, 1916.

EDWIN C. WOODWARD.